US005634147A

United States Patent [19]

Machida

[11] Patent Number: 5,634,147

[45] Date of Patent: May 27, 1997

[54] DRIVE DEVICE FOR A CAMERA

[75] Inventor: Kiyosada Machida, Urawa, Japan

[73] Assignee: Nikon Corporation, Tokyo, Japan

[21] Appl. No.: 581,993

[22] Filed: Jan. 2, 1996

[30] Foreign Application Priority Data

Feb. 23, 1995 [JP] Japan .................................... 7-059888

[51] Int. Cl.$^{6}$ .................................................... G03B 13/10

[52] U.S. Cl. ............................ 396/84; 396/85; 396/148; 396/379

[58] Field of Search ............................ 354/195.12, 199, 354/222; 396/84, 85, 148, 379

[56] References Cited

U.S. PATENT DOCUMENTS 5,036,346 7/1991 Hatamori et al. ........................ 354/199
5,068,678 11/1991 Mogamiya et al. ............... 354/195.12
5,438,381 8/1995 Mogamiya et al. .
5,477,288 12/1995 Miyazaki et al. ........................ 354/199

FOREIGN PATENT DOCUMENTS 5-297258 12/1993 Japan .

*Primary Examiner*—A. A. Mathews

[57] ABSTRACT

A camera having a lens barrel and a compartment for holding one of a spool and a cartridge. A motor in the camera is coupled to a reduction gear train which transmits a drive force of the motor to the lens barrel. A rotary shaft, positioned between the compartment and the lens barrel, is geared to and branches from the reduction gear train so as to receive a drive force from the reduction gear train. A zoom finder device, positioned between the compartment and the lens barrel is driven by the rotary shaft. This arrangement allows the motor to transmit a drive force to a driven device placed adjacent to a drive source, without making the drive device large, and without unnecessarily increasing the number of required components.

7 Claims, 2 Drawing Sheets

DRIVE DEVICE FOR A CAMERA

BACKGROUND OF THE INVENTION

1. Field of the Invention

The present invention relates to a drive device for a camera, and, in particular, to a drive device for a zoom lens and a zoom viewfinder in a camera.

2. Description of the Related Art

In known zoom cameras, a drive source (for example, a motor) and a device driven by the drive source (a "driven device", for example, a zoom viewfinder) are located adjacently, and a drive device (for example, a reduction gear train) is made to move reciprocatingly between the motor and the zoom viewfinder to transfer the drive force of the drive source. However, if the drive source must also drive, for example, a lens barrel, two separate drive sources and two separate drive devices are required. This arrangement requires twice as much space. This increases the number of required components and makes the camera bulky.

SUMMARY OF THE INVENTION

Accordingly, it is an object of the present invention to provide a drive source for a camera able to transmit a drive force to two driven devices placed adjacent to the drive source via a small drive device.

It is also an object of the present invention to provide a drive source for a camera able to transmit a drive force to two driven devices placed adjacent to the drive source via a small drive device with as few components as possible.

Additional objects and advantages of the invention will be set forth in part in the description which follows, and, in part, will be obvious from the description, or may be learned by practice of the invention.

Objects of the present invention are achieved in a camera having a lens barrel, the camera equipped with a drive source, a driven device which is driven by the drive source, a drive device to drive the lens barrel, by transmitting the drive force of the drive source to the lens barrel, and a branch drive device which drives the driven device coupled to the drive of the lens barrel, branching in the course of the transmission path of the drive device, the drive device and the branch drive device being located between a cartridge, or spool compartment, and the lens barrel.

In such a camera, because the transmission path of the drive device is branched, and the driven device is drive coupled to the driving of the lens barrel, the space taken by the drive device is minimal, the number of components is reduced, and the drive force can be transmitted to a driven device adjacent to the drive source.

Objects of the present invention are also achieved in a drive apparatus for a camera having a lens barrel and a compartment for holding one of a spool and a cartridge, the drive apparatus comprising a drive source which produces a drive force, a first driven device, a drive device which transmits the drive force of the drive source to the first driven device via a first transmission path, a branch drive device, positioned between the compartment and the lens barrel, the branch drive device coupled to, and branching from, the drive device along the first transmission path and receiving a drive force from the drive device, and a second driven device, positioned between the compartment and the lens barrel, which is driven by the branch drive device, via a second transmission path.

Objects of the present invention are further achieved in a camera comprising a lens barrel, a compartment for holding one of a spool and a cartridge, a drive source which produces a drive force, a drive device which transmits the drive force of the drive source to the lens barrel via a first transmission path, a branch drive device, positioned between the compartment and the lens barrel, the branch drive device coupled to, and branching from, the drive device along the first transmission path and receiving a drive force from the drive device, and a driven device, positioned between the compartment and the lens barrel, which is driven by the branch drive device, via a second transmission path.

Objects of the present invention are also achieved in a camera comprising a lens barrel, a compartment for holding one of a spool and a cartridge, a motor which produces a drive force, a reduction gear train which transmits the drive force of the motor to the lens barrel, a rotary shaft positioned between the compartment and the lens barrel, the rotary shaft geared to and branching from the reduction gear train so as to receive a drive force from the reduction gear train, and a zoom finder device, positioned between the compartment and the lens barrel, which is driven by the rotary shaft.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
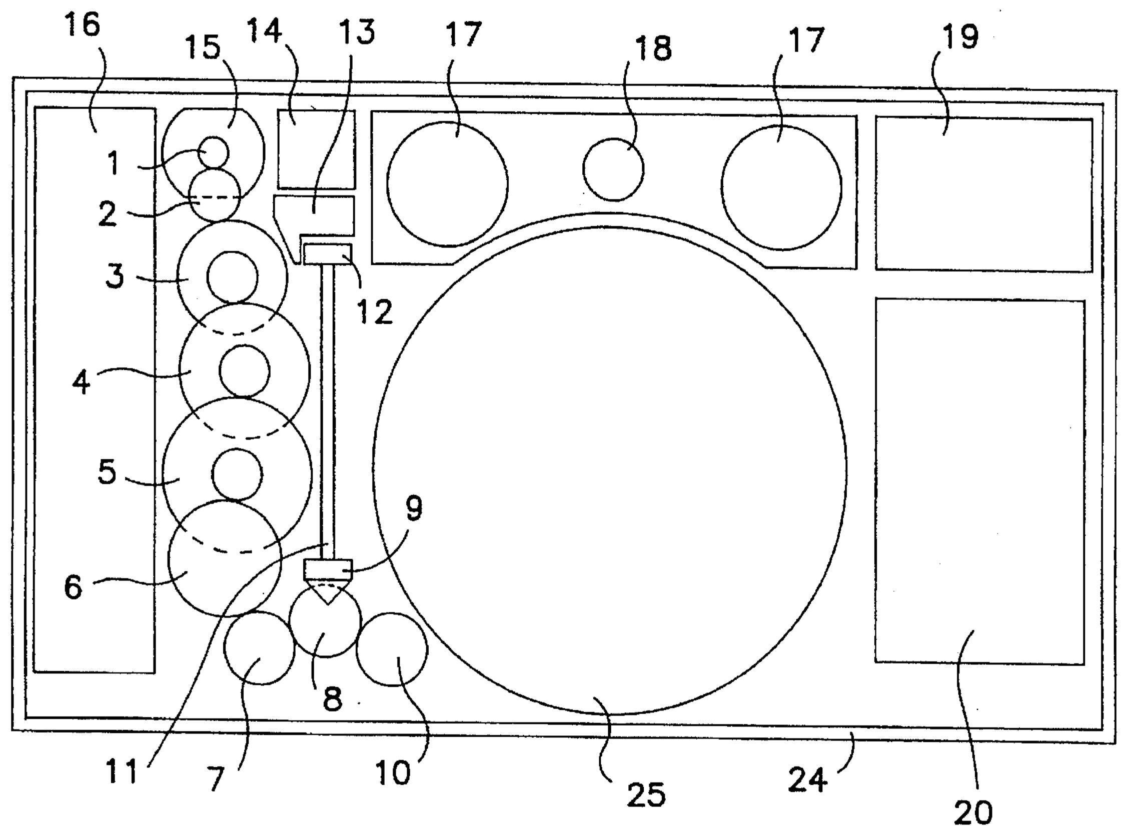
FIG. 1 is a front view of a camera in accordance with a preferred embodiment of the present invention.

Reference will now be made in detail to a present preferred embodiment of the present invention, examples of which are illustrated in the accompanying drawings, wherein like reference numerals refer to like elements throughout.

Figure 2:
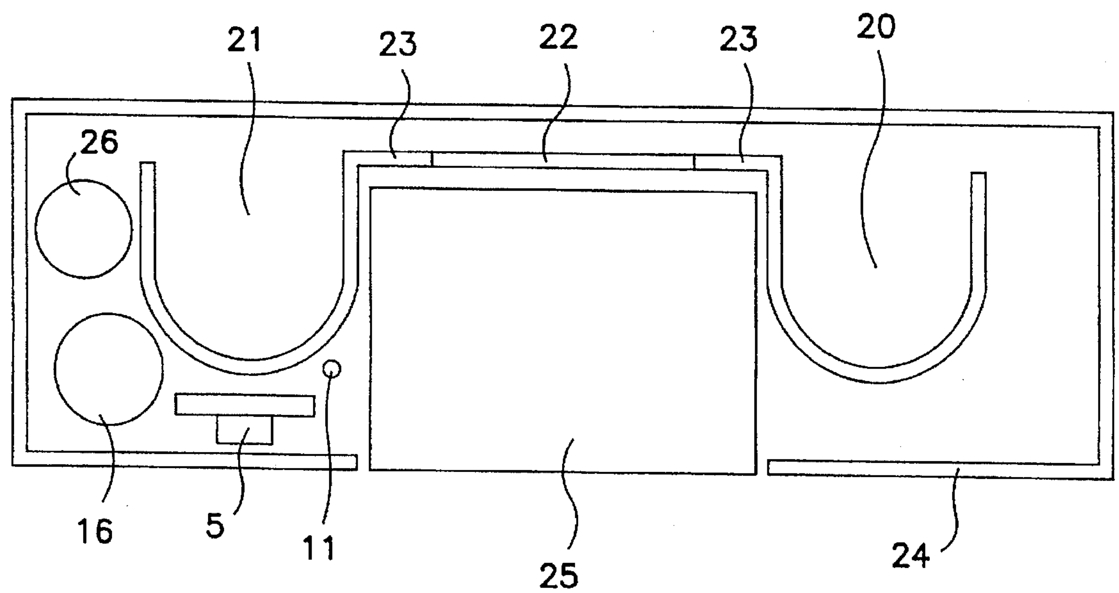
FIG. 2 is a horizontal sectional view of a camera in accordance with a preferred embodiment of the present invention.

FIG. 1 is a front view of a camera in accordance with a preferred embodiment of the present invention. FIG. 2 is a horizontal sectional view of a camera in accordance with a preferred embodiment of the present invention. In FIG. 1, a motor 15, the "drive source", is located in the upper portion of a cartridge compartment 21 (see FIG. 2). The motor 15 drives a zoom photographic lens barrel 25 via a pinion gear 1 and reduction gears 2, 3, 4, 5, 6, 7, 8, and 10, collectively the "drive device". A zoom viewfinder device. 14, the "driven device", is located in the upper portion of the cartridge compartment 21 adjacent to the motor 15. The zoom viewfinder device 14 generally comprises a viewfinder lens (not shown) and a support member (not shown). Zoom drive of the zoom viewfinder device 14 is performed by a viewfinder drive member 13. The viewfinder drive member 13 is arranged next to the lower portion of the zoom viewfinder device (looking at FIG. 1).

The drive force from the motor 15 is transmitted to the viewfinder drive member 13 via the gear 8, a bevel gear wheel 9, the "branch drive device", a shaft 11, and a spur gear 12. The gear 8 is provided with both bevel teeth and spur teeth. The bevel gear 9 is in engagement with the bevel teeth of the gear 8. The shaft 11 rotates integrally with the bevel gear 9. The spur gear 12 rotates integrally with the shaft 11 and drives the viewfinder drive member 13 in rotation.

In addition the camera is provided with active autofocus ("AF") light projection and reception windows 17, an autoexposure ("AE") window 18, a strobe ("SB") light generating unit 19, a spool cartridge compartment 20, a camera cover 24, a camera body 23, an aperture 22, a battery 26, and a capacitor 16 (for strobe use).

Figure 3:
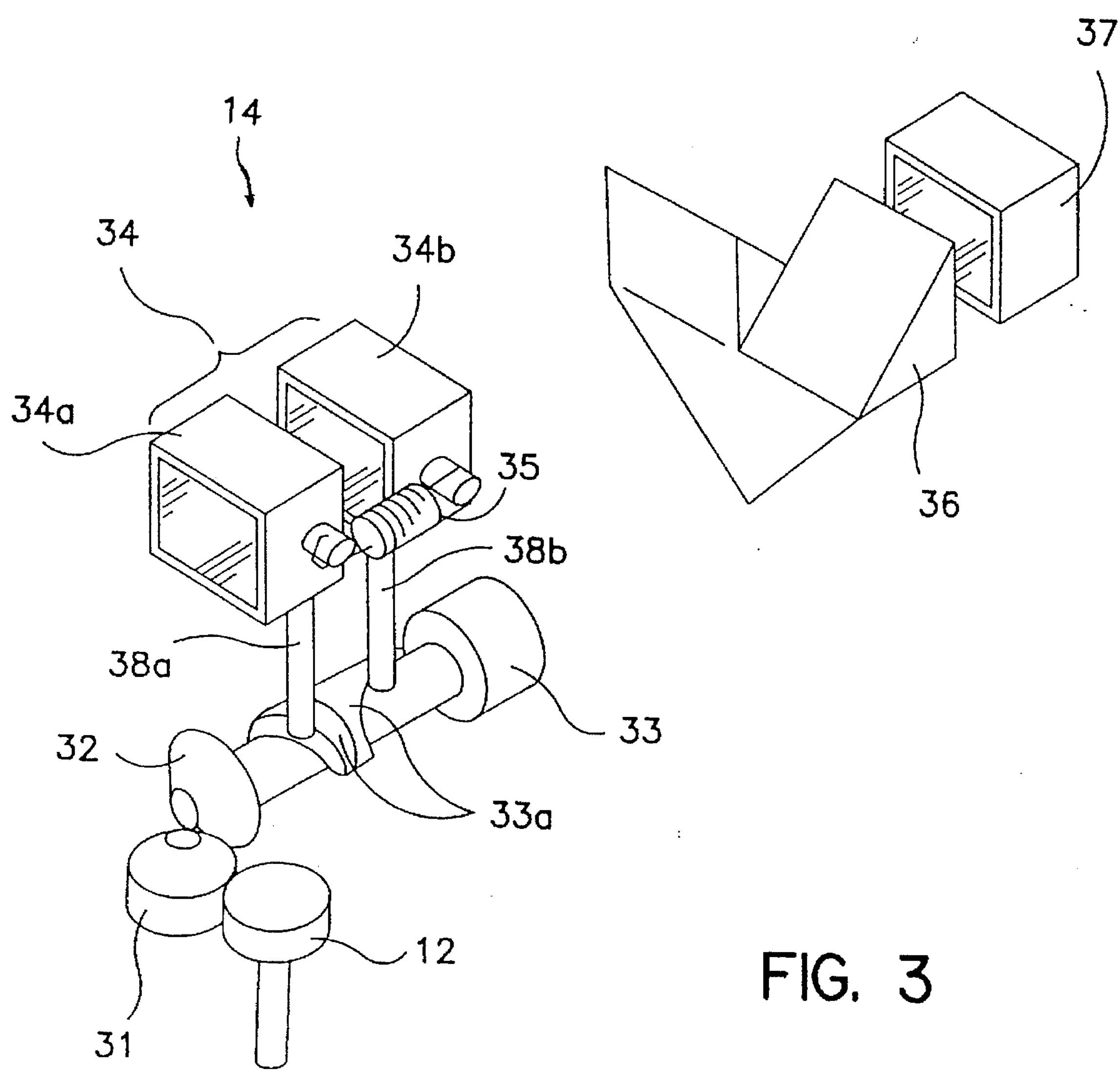
FIG. 3 is an oblique view of a camera in accordance with a preferred embodiment of the present invention.

FIG. 3 is an oblique view of a camera in accordance with a preferred embodiment of the present invention. FIG. 3 shows enlarged portions of the viewfinder drive member 13 and zoom viewfinder device 14. The drive force of the spur gear 12 is transmitted to a bevel gear 31. The bevel gear 31 is in engagement with a bevel gear 32 and causes rotation of a cylindrical cam 33. A projecting portion 33*a*, arranged on the circumferential surface of the cylindrical cam 33, is retained between a pair of columns 38*a* and 38*b* which act as followers.

A pair of objective lenses 34*a* and 34*b* are located at the upper ends of the columns 38*a* and 38*b*, respectively. A spring 35 is attached between the side surfaces of the objective lenses 34*a* and 34*b*. The projecting portion 33*a* acts as a cam surface for the columns 38*a* and 38*b* in the rotary shaft direction of the cylindrical cam 33. Thus, the cylindrical cam 33 and the columns 38*a* and 38*b* operate as a positive motion cam. Based on the Interaction between the projecting portion 33*a* and the columns 38*a* and 38*b*, the spacing of the objective lenses 34*a* and 34*b* is adjusted (zooming). The amount of zooming is controlled by the reciprocating rotation of the cylindrical cam 33. The subject images which pass through the objective lenses 34*a* and 34*b* are viewed by the photographer via a prism 36 and a eyepiece lens 37.

Referring to FIG. 2, generally, the minimum width dimension of a grip side of a camera is set by the width of the cartridge compartment 21 and the size of a battery 26. Accordingly, the capacitor 16 is located in front (the lower side looking at FIG. 2) of the battery 26, in the space formed by the lens barrel 25 and the cartridge compartment 21. This space is only enough to house one gear (on the horizontal plane). Accordingly, in accordance with the preferred embodiment, the reduction gears 2, 3, 4, 5, 6, 7, 8 and 10 are stacked vertically in the space formed by the lens barrel 25 and the cartridge compartment 21. The reduction gears 2, 3, 4, 5, 6, 7, 8 and 10 perform the necessary reduction to drive the lens barrel 25. Moreover, the drive which drives the zoom viewfinder 14 branches via the shaft 11 from the reduction gear 8. The shaft 11 is located in the space formed by fie lens barrel 25 and the cartridge compartment 21. Thus, the grip side dimension of the camera remains at a minimum, and the drive system can reciprocate.

Although the preferred embodiment of the present invention has been described with respect to a specific configuration, it will be recognized that the preferred embodiment is not limited to the specific configuration. For example, the cartridge compartment 21 is described as being located below the motor 15 and the zoom viewfinder device 14, but the spool cartridge compartment 20 may be located below the motor 15 and the zoom viewfinder device 14. Moreover, the drive source has been described as a motor 15 and the driven device as a zoom viewfinder device 14, but as long as the drive source and the driven device are located adjacently, this invention can be applied to any kind of drive source or driven device.

Although a preferred embodiment of the present invention have been shown and described, it would be appreciated by those skilled in the art that changes may be made in the embodiment without departing from the principles and spirit of the invention, the scope of which is defined in the claims and their equivalents.

What is claimed is:

1. A drive apparatus for a camera having a lens barrel and a compartment for holding one of a spool and a cartridge, the compartment being positioned beside the lens barrel, the drive apparatus comprising:

a drive source which produces a drive force, the drive source being positioned between the compartment and the lens barrel at one of an upper and a lower end of the camera;

a first driven device;

a drive device which transmits the drive force of said drive source to the first driven device via a first transmission path, the drive device extending between the compartment and the lens barrel to the opposite side of the camera as the drive source;

a branch drive device, positioned between the compartment and the lens barrel at the opposite end of the camera as the drive source, said branch drive device coupled to, and branching from, said drive device along the first transmission path and receiving a drive force from said drive device; and a second driven device, positioned between the compartment and the lens barrel at the same end of the camera as the drive source, which is driven by the branch drive device, via a second transmission path.

2. A drive apparatus, as set forth in claim 1, wherein the first driven device is the lens barrel, the second driven device is a zoom viewfinder device, the drive device is a reduction gear train, and the branch drive device is a rotary shaft geared to the reduction gear train.

3. A drive apparatus, as set forth in claim 1, wherein the drive source is located adjacent to the compartment.

4. A camera comprising:

a lens barrel;

a compartment for holding one of a spool and a cartridge, the compartment being positioned beside the lens barrel;

a drive source which produces a drive force, the drive source being positioned between the compartment and the lens barrel at an upper end of the camera;

a drive device which transmits the drive force of said drive source to said lens barrel via a first transmission path extending between said lens barrel and said compartment to a lower end of the camera;

a branch drive device, positioned between the compartment and the lens barrel at the lower end of the camera, said branch drive device coupled to, and branching from, said drive device along the first transmission path and receiving a drive force from said drive device; and a driven device, positioned between said compartment and said lens barrel at the upper end of the camera, which is driven by the branch drive device, via a second transmission path.

5. A camera, as set forth in claim 4, wherein the driven device is a zoom viewfinder device, the drive device is a reduction gear train, and the branch drive device is a rotary shaft geared to the reduction gear train.

6. A camera, as set forth in claim 4, wherein the drive source is located adjacent to the compartment.

7. A camera comprising:

a lens barrel;

a compartment for holding one of a spool and a cartridge positioned beside said lens barrel;

a motor which produces a drive force positioned between said lens barrel and said compartment at an upper end of said lens barrel;

a reduction gear train which transmits the drive force of said motor to a lower end of said lens barrel;

a rotary shaft extending between said compartment and said lens barrel, the rotary shaft geared to and branching from said reduction gear train at the lower end of said lens barrel so as to receive a drive force from said reduction gear train; and a zoom finder device, positioned between said compartment and said lens barrel at the upper end of the camera, which is driven by the rotary shaft.

* * * * *